United States Patent Office 3,322,566
Patented May 30, 1967

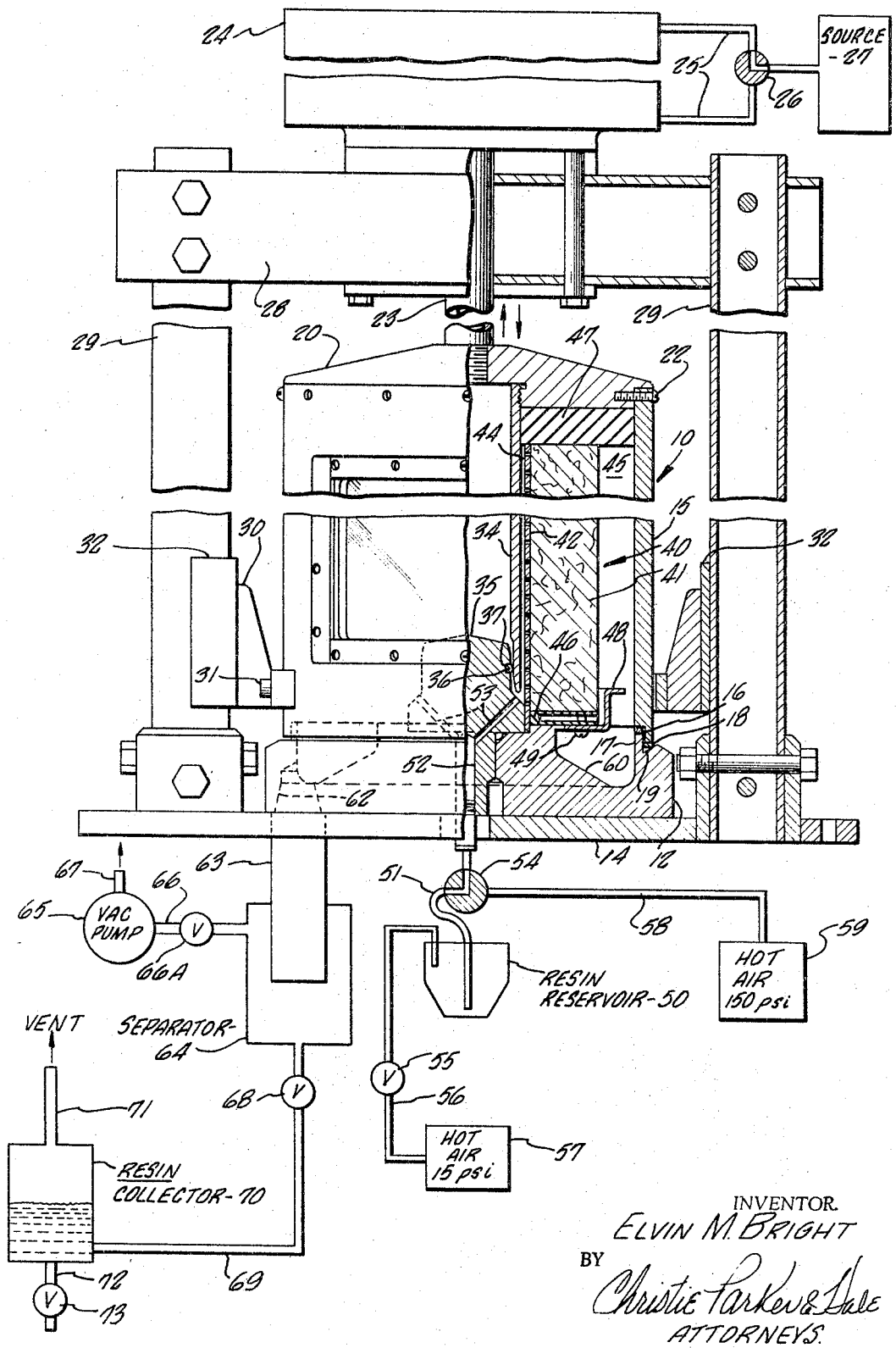

3,322,566
RESIN COATING
Elvin M. Bright, Encino, Calif., assignor to Air Logistics Corporation, Los Angeles, Calif., a corporation of California
Filed Jan. 14, 1963, Ser. No. 251,088
11 Claims. (Cl. 117—119.8)

This invention relates to methods and apparatus for applying resin coatings to fibers or filaments, such as fiber glass, textiles, zirconia, and the like, and to mats and fabrics made of such fibers.

As an example of this invention, specific reference is made to glass fibers which are widely used as reinforcing material to provide high strength for articles cast with plastic.

The glass fibers are usually produced in long strands which are wound on annular cardboard cores and then shipped for further processing and ultimate use by the consumer. For example, the glass fibers are made into sheets for various glass coating operations. It has been the practice in the past to unwrap the glass filaments from the core, pass them through a dip tank containing an appropriate resin, and then rewind the filaments on the core for later use and sheeting applications. The resin coating acts as a binder when the filaments are subsequently disposed side by side over a hot roll to produce glass fiber sheeting.

In addition to the time consumed in unwinding and rewinding the filaments on the cores, the abrading characteristics of the glass fibers produces a substantial loss in tensile strength of the fiber.

This invention eliminates the loss of time in unwinding and rewinding the fibers for coating, and also avoids the loss of from 32,000 to 87,000 p.s.i. in tensile strength by the impregnation and coating of the fibers while they remain on the core on which they were originally mounted.

In terms of method, the invention contemplates coating fibers with a fluid plastic resin. The fibers may be in the form of mats, woven textiles, wound on a spool, or the like. In any event, the fibers are disposed in a volume to define a porous barrier, and the barrier is placed in a chamber which is evacuated to remove gas from the chamber and the barrier of fibers. If the fibers are in the form of a sheet of matting or woven textile, the sheet is preferably supported by a permeable layer of a material such as polyethylene or polyurethane to prevent disintegration or deformation of the sheet of fibers. The fluid resin is introduced into the evacuated chamber and forced to flow into the barrier to coat the glass fibers.

Preferably, the vacuum is maintained on the opposite side of the barrier from that to which the resin is introduced. To facilitate evacuation, the glass fibers are heated prior to and during the evacuation step. Preferably, the fibers are heated above the pour point of the plastic which is to be used. After the plastic has been forced through the porous barrier of fibers, the excess plastic is driven out of the wall by forcing a gas through it, preferably hot air at a temperature above the pour point of the plastic. This step is particularly useful when the glass fibers are wound on a hollow cardboard core, because removal of the excess plastic prevents the core from being soggy and easily deformed when the fibers are subsequently unwound from it.

When the fibers are wound on a hollow core, they are preferably coated with plastic by disposing the core within the container to form an annular space between the outside of the core and the interior of the container. If the core wall is imperforate, it is perforated without damaging the fiber so that plastic can flow through it. For example, the cardboard core may be perforated with a sharp needle from the inside out. A sleeve is disposed within the core, and the core and sleeve are sealed at each end against the container interior so that there is an annular sealed space between the core and the tubular sleeve and an outer annular sealed space between the core exterior and the container interior. The container is evacuated so the gas or air is removed from both of the annular spaces and the porous barrier formed by the fibers. Thereafter, a metered amount of fluid plastic is flowed into the inner annular space, through the core and fibers, and out into the outer annular space.

The plastic is followed by an injection of hot air at a temperature in excess of the flow point of the plastic. In the presently preferred system, the plastic is injected under hot air pressure so that when a sufficient amount of plastic has been injected into the fiber glass to thoroughly coat the fibers, the plastic is immediately followed by a flow of hot air, which displaces excess plastic from the void spaces between the filaments.

For best results, the plastic system used for impregnation should have certain characteristics. An important characteristic is that the plastic have a solid or immobile quality when its temperature is below a certain value, say 150° F. Above this temperature, which is called the flow point, the plastic system is fluid and has a relatively low viscosity so it can be injected through the core and void spaces between fibers without excessive pressure. On the other hand, on cooling, it should have a semi-rigid structure so that it does not slowly flow off the fibers while the package is shipped or stored. Since polymeric plastic materials do not have true crystalline structures, the preferred plastic system includes at least one reactant which does have a crystalline or immobile solid structure, and the reaction to form the polymeric products is not carried to completion. The impregnating resin, therefore, is preferably a two-phase system. For example, if component A and component B react to produce a polymeric product AB, the impregnating plastic actually consists of a mixture of AB, A, and B, of which at least A or B, upon cooling, forms a solid, immobile structure.

In another form, the plastic is a pre-polymer, i.e., a partially polymerized resin such as a polyester or a phenol formaldehyde, and has a flow point which is well above that normally encountered in handling and storing the coated fibers. A still further form is a partially polymerized resin in a solvent. When the solvent is evaporated, the resin is left immobile.

The physical characteristics of the impregnating plastic, in addition to those set forth above, are that it have a low melting temperature, a reasonable shelf life, and a reasonable tank life. The reaction of the components in the impregnating plastic is only partially completed at the time of the impregnating step of the process, and is subsequently carried to completion when the plastic is cured to produce a glass fiber sheet or other product.

At the present time, the plastic system is obtained from the reaction of an acidic anhydride, a diepoxide, and a glycol in the presence of a metallic salt catalyst. In selecting the acidic anhydride or the diepoxide, one of them must be capable of forming an immobile mass upon cooling to room temperature. Since the glycol is present in a relatively small proportion (usually less than 10%), its selection is not based upon its crystalline characteristics.

Examples of basic reactants to form epoxy resins that may be used in accordance with this invention are disclosed in U.S. Patents Nos. 2,890,194; 2,890,195; 2,890,196; 2,890,197; 2,890,200; 2,890,210; 2,917,469; and 2,948,688.

In terms of apparatus for coating fibers with a fluid plastic resin, the fibers being disposed in a volume to define a porous barrier, the invention comprises a chamber, means for sealing the barrier of fibers in the chamber to form a first space on one side of the barrier and a second pace on the other side of the barrier. Means are provided for evacuating the two spaces and the barrier. Means are also provided for admitting fluid plastic resin to one of the spaces while the barrier is evacuated. Means are further provided for forcing the plastic through the evacuated barrier to coat the fibers in it.

Preferably, the container includes a sump in the bottom of the space on the opposite side from the barrier on which resin is admitted, and the sump is connected to a separator which in turn is connected to a vacuum pump through which the chamber is evacuated.

In the preferred embodiment, the fibers are wound on an annular core which is perforated so that plastic can flow through it. The container includes an upright hub around which the core is disposed. A tubular sleeve is disposed within the core and sealed at one end to the hub and at its other end to the top of the container. Sealing means are also provided for forming a sealed outer annular space between the exterior core and the interior of the container wall. A second or inner annular space is also formed between the interior of the core and the interior of the tubular sleeve. A vacuum pump is connected to the outer annular space and plastic injection means is connected to the inner annular space, so that plastic can be injected into the evacuated porous barrier of fibers from the inside out.

These and other aspects of the invention will be more fully understood from the following detailed description and the accompanying drawing which is a schematic elevation showing the presently preferred apparatus and method for coating glass fibers.

A container 10 includes a circular base 12 mounted on a flat support plate 14. The lower end of an upright cylindrical wall 15 includes an annular internal and downwardly facing shoulder 16 which rests on the upper edge of an upright annular base wall 17. A curved piece of glass 17A is held by a curved frame 17B over a generally rectangularly shaped window 17C in the container wall. The lower end of the cylindrical wall makes a vacuum tight seal against an O-ring 18 disposed in an annular groove 19 around the base.

A container top 20 is secured by screws 22 to the upper end of the container wall. The lower end of a piston rod 23 is threaded into the upper surface of the container top. The upper end of the piston rod fits into a conventional air cylinder 24 which includes the usual air lines 25 connected through a control valve 26 to a source of compressed air 27. Thus, by operation of the control valve 26, the container top and wall can be moved up and down with respect to the base. The air cylinder is mounted on top of a horizontal cross bar 28 secured at its opposite ends to the upper ends of vertical posts 29 which are secured at their lower ends to the support plate on opposite sides of the base. A pair of guide brackets 30 are secured by bolts 31 to opposite sides of the exterior of the container wall. The brackets have outwardly opening arcuate sections 32 which each makes a sliding fit half way around the interior portion of a respective post and guides the container wall to and from the position shown in the drawing.

A tubular sleeve 34 is coaxially disposed within the container wall and is threaded at its upper end into the container top. The lower end of the sleeve makes a close fit around an upwardly extending hub 35 formed in the center of the container base. A pressure-tight seal is made between the hub and the lower end of the sleeve by an O-ring 36 disposed in an annular groove 37 around the hub.

A spool 40 of glass fiber 41 wound around a tubular cardboard core 42 is disposed coaxially around the hub in the position shown in the drawing. The core includes perforations 43 which may be formed by perforating the core from the inside out with a needle. When the piston rod is in the lower position so that the lower end of the container wall is sealed as shown, the sleeve 34 makes a close fit within the cardboard core to define a first or inner annular space 44 between the exterior of the sleeve and the interior of the cardboard core. A second or outer annular space 45 is defined between the exterior of the spool of glass fibers and the interior of the container wall. The lower end of the spool rests on an annular lower gasket 46 which makes a pressure-tight seal between the lower end of the spool and the base. An annular upper gasket 47 disposed around the sleeve makes a pressure-tight seal between the upper end of the spool and the interior of the container top.

An annular lifting ring 48 is attached by a screw 49 to the periphery and underside of the lower gasket to facilitate installing and removing the spool of glass fibers.

Plastic is injected into the container from a resin reservoir 50 through a line 51 connected to the lower end of a vertical plastic injection conduit 52 which opens out of the lower end of the base. A pair of upwardly and outwardly extending branch conduits 53 are connected at their lower ends to the upper ends of conduit 52 and discharge at their upper ends on opposite sides of the hub below the seal made by the O-ring 36 between the hub and the lower end of the sleeve. A two-way control valve 54 in line 51 controls the admission of plastic into the chamber. With the valve set in the position shown in the drawing, plastic is forced into the container by the application of hot air pressure to the top of the reservoir through a valve 55 and a line 56 connected to a lower pressure hot air source 57. For example, the temperature of the air may be about 180° F. and its pressure 15 p.s.i. Rotating the valve 54, 90° in a clockwise direction (as viewed in the drawing), connects the plastic inlet conduit 52 through a line 58 to a high-pressure hot air source 59 where air is at a pressure between 80 to 120 p.s.i. and at a temperature of about 180° F. There is no upper limit on the pressure used to inject the plastic, provided the fiber is suitably supported against unwanted displacement. Substantially higher pressures are used to reduce injection time, particularly when the plastic is relatively viscous. For example, hydraulic injection pressures of 2000 p.s.i. have been used for rapid coating of the fiber with plastic.

An upwardly opening annular plastic sump 60 is formed around the base periphery and opens into a downwardly extending vacuum conduit 62 which opens out of the bottom of the base. A vacuum line 63 is secured at one end to the vacuum conduit 62 and at its other end to an air-plastic separator 64. A conventional vacuum pump 65 is connected to the upper end of the separator through a line 66 and valve 66A and discharges to atmosphere through line 67. The lower end of the separator is connected through a valve 68 and a line 69 to a plastic collector 70. The plastic collector is vented at its top vent line 71 and plastic is withdrawn from the bottom of the plastic collector through discharge line 72 and a valve 73.

To impregnate a spool of glass fiber, the air cylinder is operated to lift the piston rod and container top and wall so that a spool of glass fiber can be set on the lifting ring around the hub as shown in the drawing. The air cylinder is then actuated to lower the piston rod, container top, container wall, and sleeve into the position shown in the drawing. Pressure-tight seals are now effected between the lower edge of the container wall and the base, the lower end of the sleeve and the hub, the lower end of the spool and the base, and the upper end of the spool and the container top.

The control valve 54 is closed so that neither plastic nor hot air can flow into the container. Separator valve 68 is closed, resin collector valve 73 is closed, and the vacuum pump valve 66A is opened, and the vacuum pump is turned on to evacuate the chamber to a vacuum of 28 to 29 inches of mercury.

The evacuation is continued until substantially all of the air or gas is removed from within the container and the void spaces between the windings of glass fiber on the spool. During evacuation, the spool and container may be heated by any suitable means (not shown), including flowing hot air through the container and fiber glass package. Once the desired temperature, say, 180° F., is reached, the air flow is discontinued and the container and spool are thoroughly evacuated. To speed the heating process, the spool is pre-heated in an oven (not shown) and placed in the container at a temperature of 180° F. or higher.

The plastic control valve 54 and the low-pressure air control valve 55 are opened so that pressurized hot air is applied to the top of the plastic in the reservoir to force plastic up through the resin line 51. The annular space between the cardboard core and the sleeve is filled with plastic and the plastic flows outwardly through the perforations in the cardboard core and to the exterior of the spool, coating the glass fiber with plastic in the process. If the core is not perforated prior to winding the glass fibers on it, the core is perforated prior to installing the spool in the position shown in the drawing. The core may be perforated in any suitable manner, but preferably is done by the use of a needle which is applied from the interior of the core and in such a manner as to perforate the core but not damage the glass fibers wound on it. The size of the perforations is not critical and, conveniently, they may be made with a needle on about one-inch centers. The evacuation of the container and spool has been found to be important because the plastic is relatively viscous, say, compared to water, and unless the system is thoroughly degassed, the plastic tends to flow through the void spaces in a spotty fashion so that there would not be uniform coverage of the glass fibers.

Best results are obtained when the plastic is especially prepared, and the details of the plastic formulation are discussed below.

The injection of the plastic is continued until a sufficient amount of plastic has been admitted into the container to coat the fibers completely. Conveniently, this occurs when the plastic level in the reservoir reaches the lower end of line 54, and then hot air from the low-pressure air source automatically displaces the plastic from the injection line and the annular space between the core and the sleeve. Although the amount of plastic applied to the filament is not entirely critical, certain applications require about 17% to about 25% plastic by weight on the filament on the finished product.

The exterior of the spool is observed through the viewing window to be sure that sufficient plastic has been injected to cause plastic to flow uniformly over the exterior of the glass fibers on the spool. Valve 54 is then turned 90° clockwise from the position shown in the drawing so that hot air under relatively high pressure is blown through the spool from inside out. The flow of hot air is continued until substantially no additional excess plastic is observed to flow from the spool and drain down into the sump. The flow of hot air is then discontinued, and there is now about 17% to about 25% plastic by weight uniformly coated on the glass fibers. The vacuum pump valve 66A is closed and the vacuum pump 65 is turned off. If desired, the pump valve may be turned off as soon as the uniform layer of plastic is observed on the exterior of the spool to reduce the possibility of pulling plastic vapors through the vacuum pump. The separator valve 68 is opened and the air pressure within the container forces a residual plastic from the sump into the separator, into the plastic collector. Air pressure within the container is also equalized to atmospheric through either of valves 66A or 68. After the plastic is displaced from the sump and line 63, valve 54 is closed, the container top and wall are lifted, and the coated spool is removed so that the foregoing process may be repeated.

The coated spool is then allowed to cool to room temperature and the plastic sets to an immobile semi-rigid state so that it will not drain or drip from the spool. Moreover, the plastic in this condition will not make the spool core soft, and thereby avoids a condition where eventual unwinding back tension would distort the package, as would be the case if the core were soft or mushy due to plastic remaining in fluid state. In coating fibers disposed in the form of a matted or woven sheet, a layer of porous material inert to the plastic, say, polyethylene, polyurethane, or metal screen, is disposed against the sheet of fiber glass and the two are rolled up to form a supported annular wall of fiber glass which is impregnated and coated as the spool described above.

To reduce the amount of time that a spool is in the apparatus, the spool may be removed as soon as it is impregnated with plastic, and transferred to another container (not shown) where excess plastic is removed by forcing hot, dry air through the spool.

THE PLASTIC SYSTEM

For best results, the plastic system should be immobile when its temperature is below a certain level, say 122° F., which is well above the normal ambient temperature during storage, transportation, and usual handling. Above this temperature, the plastic system is fluid and has a sufficiently low viscosity so that it can be injected through the spool of glass fibers without excessive pressure. On cooling, it preferably is immobile so that the plastic does not drip off of the fibers while the package is shipped and stored, and so that the core, usually cardboard, is not kept soft and mushy.

The presently preferred plastic system is obtained from the partial reaction of an acidic anhydride, a diepoxide, and a glycol in the presence of a metallic salt catalyst. In selecting the acidic anhydride or the diepoxide, at least one of them must be capable of forming an immobile mass at room temperature.

In combination with UNOX-201, a trademark for liquid diepoxide, the following acidic anhydrides may be used to form an immobile mass on cooling:

*Table I*

Hexahydrophthalic anhydride
Tetrahydrophthalic anhydride
Glutaric anhydride
Trimellitic anhydride
Chlorendic anhydride
Maleic anhydride The primary requirement is that the acidic anhydride be soluble or readily miscible in the diepoxide.

When UNOX-207, a trademark name for a solid diepoxide, is used, either a liquid or a solid acidic anhydride may be used. However, as to the solid anhydrides, they must have a sufficiently low melting point to solubilize the solid diepoxide. Suitable liquid acidic anhydrides are nadic methyl anhydride, and dodecenyl succinic anhydride. Suitable solid anhydrides are:

*Table II*

Hexahydrophthalic anhydride
Maleic anhydride
Glutaric anhydride

Either solid or liquid glycols can be used. The choice of glycols is limited in that a fairly compact molecular structure is preferred for low viscosity and best wetting characteristics. Examples of solid glycols which can be used are:

*Table III*

Trimethylol propane
Trimethylol ethane
Neopentyl glycol-paraxylene glycol

Examples of the liquid glycols which can be used are:

Table IV

Trimethylol propane monoallyl ether
Hexanetriol
Glycerol

Suitable metallic catalysts are organo tin compounds such as dibutyl-tin oxide, and the so-called Lewis acids (materials which behave like acids without actually being acidic, such as Stannic chloride).

Specific examples of resin systems are as follows:

EXAMPLE I

|  | Mols |
|---|---|
| Dicyclopentadiene dioxide | 1 |
| Maleic anhydride | 1 |
| Trimethylol propane | .25 |

EXAMPLE II

|  | Percent by wt. |
|---|---|
| Shell 1001 | 87.8 |
| Phenyl glycidyl ether | 3.5 |
| Boron trifluoride monoethyl amine complex | 7.9 |
| Methyl dianiline | .8 |

Shell 1001 is an epoxy resin produced by reaction of epichlorohydrin and bisphenol-A, containing the 1.2 epoxy linkage, having an average molecular weight of 875, epoxide equivalent of 450–550, and melting in the range of 167–176° F.

EXAMPLE III

|  | Percent by wt. |
|---|---|
| AX–102 | 80 |
| Diallylphthalate | 18 |
| Dicumyl peroxide | 2 |

AX–102 is a linear polyester comprised of the esterification products of dihydric alcohol with dicarboxylic acid. The dicarboxylic acid may contain various proportions of saturated acids (phthalic, succinic, adipic) and unsaturated (maleic and fumaric) acid, usually in the range of 3 mols saturated per mol of unsaturated, to 1 mol saturated per mol of unsaturated. Such polyesters have acid numbers of less than 28 and melt in the range of 140°–176° F.

EXAMPLE IV

|  | Percent by wt. |
|---|---|
| Trimethylol phenol | 35.0 |
| BRLA 7541 | 64.4 |
| Magnesium oxide | .6 |

BRLA 7541 is a resinous phenolic product formed by the reaction of formaldehyde and hydroxy aromatic compounds, wherein there is less than 1 mol of formaldehyde per mole of hydroxy aromatic compounds. By definition, such products are known as Novolacs and require additional functional groups to be cross-linked. Such Novolacs melt in the range of 104°–212° F.

I claim:

1. The method of coating elongated fibers with a fluid plastic resin, the fibers being disposed in a volume to define a porous barrier, the method including the steps of disposing the barrier of fibers in a chamber, evacuating the chamber to remove gas from it and the barrier of fibers, introducing the fluid resin into the evacuated chamber, forcing the resin through the barrier to coat the fibers, and expelling with heated gas resin from the barrier of fibers in excess of that coating the fibers.

2. The method of coating elongated fibers with a fluid plastic resin, the fibers being disposed in a volume to define a porous barrier, the method including the steps of disposing the barrier of fibers in a chamber, evacuating the chamber to remove gas from it and the barrier of fibers, introducing the fluid resin into the evacuated chamber on one side of the barrier while maintaining a vacuum on the opposite side of the barrier, forcing the resin through the barrier to coat the fibers, and expelling with heated gas resin from the barrier of fibers in excess of that coating the fibers.

3. The method of coating elongated glass fibers with a fluid plastic resin having a flow point in excess of normal ambient temperatures, the fibers being disposed in a volume to define a porous barrier, the method including the steps of disposing the barrier of fibers in a chamber, evacuating the chamber to remove gas from it and the barrier of fibers, heating the fibers above the flow point for the resin, introducing the fluid resin into the evacuated chamber on one side of the barrier, forcing the resin through the barrier to coat the glass fibers, and expelling with heated gas resin from the barrier of fibers in excess of that coating the fibers.

4. The method of coating glass fibers with a fluid plastic resin, the fibers being disposed in a volume to define a porous barrier, the method including the steps of disposing the barrier of fibers in a chamber, evacuating the chamber to remove gas from it and the barrier of fibers, heating the fibers and the resin above the flow point for the resin, introducing the fluid resin into the evacuated chamber on one side of the barrier, forcing the resin through the barrier to coat the glass fibers, and expelling with heated gas resin from the barrier of fibers in excess of that coating the fibers.

5. The method of coating fibers with a fluid plastic resin, the fibers being disposed in a volume to define a porous barrier, the method including the steps of disposing the barrier of fibers in a chamber, evacuating the chamber to remove gas from it and the barrier of fibers, introducing the fluid resin into the evacuated chamber on one side of the barrier, forcing the resin through the barrier to coat the fibers, and thereafter forcing heated gas through the barrier of fibers to drive out excess resin.

6. The method of coating glass fibers with a fluid plastic resin, the fibers being disposed in a volume to define a porous barrier, the method including the steps of disposing the barrier of fibers in a chamber, evacuating the chamber to remove gas from it and the barrier of fibers, introducing the fluid resin into the evacuated chamber on one side of the barrier, forcing the resin through the barrier to coat the glass fibers, and thereafter forcing gas heated above the resin flow point through the barrier to drive out excess resin.

7. The method of coating glass fibers with a fluid plastic resin, disposing the fibers in a volume to define an annular porous barrier in a chamber, disposing an annular sleeve within the barrier, sealing the ends of the sleeve against the ends of the barrier to form an annular space between the sleeve and barrier, evacuating the chamber to remove gas from it, the barrier of fibers, and the said annular space, introducing the fluid resin into the said annular space on one side of the barrier, forcing the resin outwardly through the barrier to coat the glass fibers, and expelling with heated gas resin from the barrier of fibers in excess of that coating the fibers.

8. The method of coating glass fibers with a fluid plastic resin, the fibers being disposed on a hollow core to define an annular porous barrier, the method including the steps of perforating the core, disposing the core and barrier of fibers in a chamber, evacuating the chamber to remove gas from it and the barrier of fibers, introducing the fluid resin into the evacuated chamber on one side of the barrier, forcing the resin through the barrier and perforated core to coat the glass fibers, and expelling with heated gas resin from the barrier of fibers in excess of that coating the fibers.

9. The method of coating glass fibers with a mixture of a plastic resin and a material which is semi-rigid at normal ambient temperatures, the fibers being disposed in a volume to define a porous barrier, the method including the steps of disposing the barrier of fibers in a chamber, evacuating the chamber to remove gas from it and the barrier of fibers, heating the mixture above normal ambient temperature, introducing the fluid resin into the evacuated chamber on one side of the barrier, forcing the mixture of resin and material through the barrier to coat the glass fibers, expelling with heated gas resin from the barrier of fibers in excess of that coating the fibers, and cooling the mixture to normal ambient temperature.

10. The method of coating glass fibers with a fluid mixture of a diepoxide resin and an acidic anhydride, the fibers being disposed in a volume to define a porous barrier, the method including the steps of disposing the barrier of fibers in a chamber, evacuating the chamber to remove gas from it and the barrier of fibers, introducing the fluid resin into the evacuated chamber on one side of the barrier, forcing the resin through the barrier to coat the glass fibers, and expelling with heated gas resin from the barrier of fibers in excess of that coating the fibers.

11. The method of coating glass fibers with a fluid mixture of diepoxide resin, a glycol, and an acidic anhydride, the fibers being disposed in a volume to define a porous barrier, the method including the steps of disposing the barrier of fibers in a chamber, evacuating the chamber to remove gas from it and the barrier of fibers, introducing the fluid resin into the evacuated chamber on one side of the barrier, forcing the resin through the barrier to coat the fibers, and expelling with heated gas resin from the barrier of fibers in excess of that coating the fibers.

References Cited

UNITED STATES PATENTS

| 2,698,260 | 12/1954 | Meauze | 117—102 |
| 2,847,714 | 8/1958 | Sullivan | 18—58.3 |
| 2,903,389 | 9/1959 | Fujita | 117—119 |
| 2,906,660 | 9/1959 | Hungerford et al. | 117—126 |
| 2,908,591 | 10/1959 | Sack | 117—124 |
| 3,010,602 | 11/1961 | Randolph | 117—126 |

FOREIGN PATENTS 1,289,681  2/1962  France.

ALFRED L. LEAVITT, *Primary Examiner.*

A. H. ROSENSTEIN, *Assistant Examiner.*